May 19, 1936.  H. E. SAUNDERS  2,041,373

NEGATIVE CARRIER FOR PHOTOGRAPHIC PRINTING MACHINES

Filed May 15, 1935

Inventor
H. E. Saunders
by George P. Mackie
Atty

Patented May 19, 1936

2,041,373

UNITED STATES PATENT OFFICE 2,041,373

NEGATIVE CARRIER FOR PHOTOGRAPHIC PRINTING MACHINES

Henry E. Saunders, Toronto, Ontario, Canada

Application May 15, 1935, Serial No. 21,531

13 Claims. (Cl. 95—76)

In making press plates on photographic offset printing machines, it is the general practice to fasten the negative to a frame or carrier, which frame or negative carrier is attached to the movable carriage of the machine proper, and the latter then adjusted to the desired position relative to the sensitized press.

With negative carriers of this type, it is very important that great care be exercised in securing the negative to the carrier in proper position, as while it is possible to adjust the position of the carrier on straight lines, longitudinally or transversely of the sensitized plate, it is not possible to make any angular adjustment of the carrier.

My object therefore is to devise a negative carrier which will permit the negative being secured in place in approximately correct position relative to the carrier frame, and then by means of a registering table, adjust it to its final precise positioning relative to the said negative carrier frame, the said frame being, afterwards mounted in the machine proper and then set, by means of the machine, for printing on the sensitized plate in any desired position.

Considerable trouble has been caused heretofore with the previous apparatus due to the breaking of negatives on account of the necessity for manual adjustment being required to provide for the latter being of different thicknesses. A further object of my invention therefore is to devise a carrier which will accommodate itself automatically to negatives of varying thicknesses, without danger of breaking the negatives and still permitting the necessary intimate contact between the negative and sensitized plate during the exposure of the latter.

I attain my objects by providing an open rectangular carrier frame which is attachable to the movable carriage of the machine, and by securing the negative or negatives to a transparent plate of glass or other suitable material which latter is mounted in the open frame so that it may be moved in the plane of the plate surfaces, and by floatingly mounting said transparent plate so that it may freely and automatically move to or from the sensitized plate to accommodate itself to various thicknesses of negative.

Figure 1:
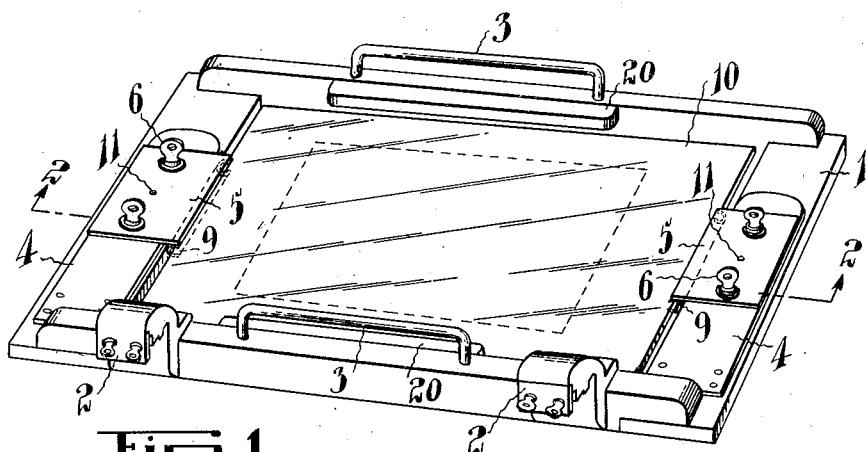
Figure 4:
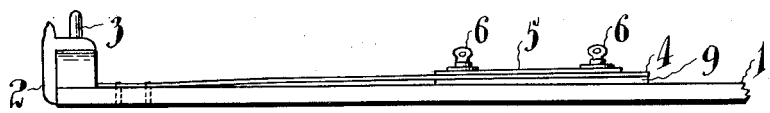
Figure 2:
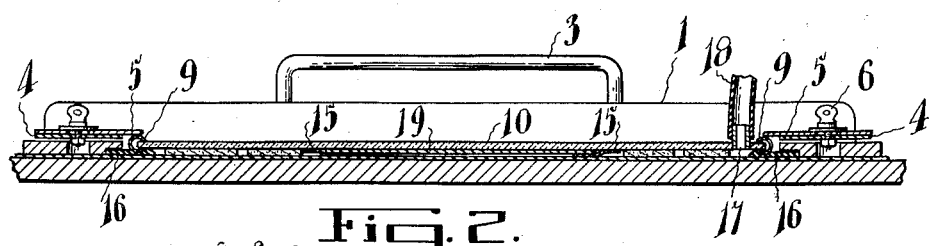
Figure 3:
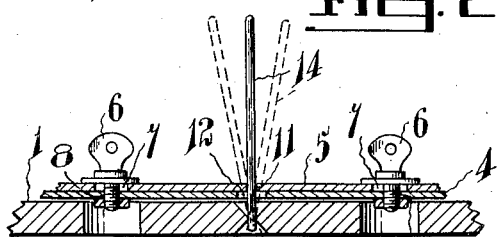

The carrier frame is hereinafter more specifically described and illustrated in the accompanying drawing in which Fig. 1 is a perspective view of the improved carrier frame;

Fig. 2 a cross section on the line 2—2 in Fig. 1;

Fig. 3 a detail illustrating the method of adjusting the position of the glass plate with the negative; and Fig. 4 a partial end elevation of the frame.

1 indicates the negative carrier frame, which is of substantially rectangular shape and provided at one side with guide brackets 2 by means of which it may be mounted on the carriage of the machine.

The side bars of the frame are provided with handle 3 by means of which it may be manually moved about.

Each end bar of the frame has secured thereto a wide flat strip 4 of flexible metal. Each strip is secured at one end by rivets or other suitable fastening means to the end bar of the frame adjacent the end of said bar. The other end of each strip extends slightly past the middle of the end bar, as will be seen particularly in Fig. 1, and has adjustably connected therewith a glass plate supporting wing or bracket 5. To adjust the wing on the strip, the latter is held in place by clamping screws 6 which project through enlarged holes 7 in the wing 5 and are threaded into holes 8 in the strip. The wings 5 each have a socket 9 in which the edge of a glass plate 10 is received. This socket is preferably formed of tubing cut open at one side, the edges being sprung apart to receive the glass. The tendency of the spread tubing to return to normal position ensures a firm engagement with the glass plate.

The glass plate 10 is smaller than the inside measurements of the frame 1, leaving a clearance of one quarter inch or so at all sides.

It will be seen that by loosening the clamping screws 6, the glass plate, with the wings may be moved in any direction in the plane of the surface of the glass plate within the limits of the size of the holes 7.

I have, however, devised a novel method of effecting this adjustment, which is illustrated particularly in Fig. 3.

A hole 11 is formed in each of the wings 5, an alined clearance hole 12 in the strip 4, and a hole 13 in the end bar of the frame. This hole in the end bar is countersunk at its upper side, and also preferably, though not necessarily, at the under side to give it outwardly flaring sides. The adjustment is effected by a tool 14 the end of which is projected through the holes 11 and 12 into the hole 13. By rocking the tools in the proper direction using the narrow part of the hole 13 as a pivot, the wings, and therefore the glass plate, may be moved longitudinally, transversely or angularly to properly position the negative. When the negative has been properly positioned the clamping bolts may be tightened to hold the glass plate in place.

The negative 19 is secured to the under side of the glass plate 10 by gummed strips 15 or in any other convenient manner. In the case of a film negative a clear glass backing plate may also be employed. Owing to the supporting of the glass supporting wings on the flexible strips 4, it will be seen that the glass plate may automatically rise or fall to accommodate itself to negatives of varying thicknesses.

It is desirable, of course, that during the exposure of the sensitized plate an intimate contact be established between the negative and sensitized plate.

In Fig. 2, I show the negative carrier arranged so that a vacuum may be created in the space between the glass plate 10 and sensitized plate to ensure this intimate contact of negative and sensitized plate. A rectangular shaped cast sponge rubber sealing member 16 is positioned about the metal frame and secured in place by suitable means, such for example as dome fasteners. The sealing member engages both the metal frame and the glass plate and thus acts as a mask for the space between the glass plate and frame and in addition the clamping of the sealing member between the glass plate and sensitized plate effectively seals the space in which the negative is placed, thus permitting evacuation of the air from between the glass and sensitized plate. A simple method of evacuating the air is to form a hole 17 through the glass plate and by means of a hose 18 connect said hole with a suitable air suction mechanism. Other arrangements than that shown may however be devised for evacuating the air to ensure a perfect contact between the negative and sensitized plate.

In cases where the negative is comparatively small relative to the glass plate 10, suitable packing strips 19 may be employed around the negative for the purpose of supporting the sensitized plate and preventing buckling of the same under the vacuum.

It will be seen that the floating mounting of the transparent plate and negative permits the transparent plate and negative to tilt or otherwise accommodate themselves to the surface of the sensitized plate, and thus avoiding breaking of the transparent plate or negative.

From the above description, it will be seen that I have devised a carrier in which the transparent plate and negative are floatingly supported and which readily accommodates itself therefore automatically to negatives of various thicknesses, and that the transparent plate with the negative secured thereto may be readily adjusted relative to its supporting frame to properly position the negatives and that quick and convenient means are provided for effecting this positioning.

What I claim as my invention is:—

1. In a negative carrier, the combination of an open frame; a pair of flexible supports each secured at one end to a side of the frame; and a transparent negative supporting plate carried by the other end of said supports.

2. In a negative carrier, the combination of an open frame; a transparent negative supporting plate having its edges in spaced relationship to the inside of the frame; and brackets for supporting said plate on said frame; said brackets being adjustable longitudinally of the sides of the frame to which they are connected.

3. In a negative carrier, the combination of an open frame; a transparent negative supporting plate having its edges in spaced relationship to the inside of the frame; and brackets for supporting said plate on said frame; said brackets being adjustable transversely of the side of the frame to which they are connected.

4. In a negative carrier, the combination of an open frame; a transparent negative supporting plate having its edges in spaced relationship to the inside of the frame; and brackets for supporting said plate on said frame; said brackets being adjustable longitudinally and transversely of the sides of the frame to which they are connected.

5. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable longitudinally of said supports.

6. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable transversely of said supports.

7. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable longitudinally and transversely of said supports.

8. In a negative carrier, the combination of an open frame; a transparent negative supporting plate having its edges in spaced relationship to the inside of the frame; and brackets for supporting said plate on said frame; said brackets being adjustable longitudinally and transversely of the sides of the frame to which they are connected; and means for locking said brackets in position as adjusted.

9. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable longitudinally and transversely of said supports; and means for locking said brackets in position as adjusted.

10. In a negative carrier, the combination of an open frame; a transparent negative supporting plate having its edges in spaced relationship to the inside of the frame; and brackets for supporting said plate on said frame; said brackets being adjustable longitudinally and transversely of the sides of the frame to which they are connected; said brackets and the frame having alined holes therein, the upper end of said holes in the frame being countersunk.

11. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable longitudinally and transversely of said supports; said brackets, supports and frame having alined holes therein, the upper end of said holes in the frame being countersunk.

12. In a negative carrier, the combination of an open frame; a transparent negative supporting plate having its edges in spaced relationship to the inside of the frame; and brackets for supporting said plate on said frame; said brackets being adjustable longitudinally and transversely of the sides of the frame to which they are connected; said brackets and the frame having alined holes therein, the upper end of said holes in the frame being countersunk; and a lever extending into said alined holes for moving said bracket relative to the frame.

13. In a negative carrier, the combination of an open frame; a pair of flexible supports each secured at one end to a side of the frame; a transparent negative supporting plate having its edges in spaced relationship to the inside of the frame; and brackets for supporting said plate from said supports, said brackets being adjustable longitudinally and transversely of said supports; said brackets, supports and frame having alined holes therein, the upper end of said holes in the frame being countersunk; and a lever extending into said alined holes for moving said bracket relative to the support.

HENRY E. SAUNDERS.